United States Patent
Baruch

(10) Patent No.: US 7,924,863 B2
(45) Date of Patent: Apr. 12, 2011

(54) DEVICE AND METHOD FOR PROCESSING DATA CHUNKS

(75) Inventor: Shavit Baruch, Kiriat Ono (IL)

(73) Assignee: Etherntty Networks Ltd., Lod (IL)

( * ) Notice: Subject to any disclaimer, the term of this patent is extended or adjusted under 35 U.S.C. 154(b) by 966 days.

(21) Appl. No.: 11/621,858

(22) Filed: Jan. 10, 2007

(65) Prior Publication Data
US 2008/0165795 A1 Jul. 10, 2008

(51) Int. Cl.
*H04L 12/56* (2006.01)
(52) U.S. Cl. .................... 370/421; 370/466; 370/469
(58) Field of Classification Search .......... None
See application file for complete search history.

(56) References Cited

U.S. PATENT DOCUMENTS

| | | | |
|---|---|---|---|
| 7,339,943 B1* | 3/2008 | Mammen et al. | 370/414 |
| 7,545,868 B2* | 6/2009 | Kennedy et al. | 375/259 |
| 2006/0077995 A1* | 4/2006 | Lenell | 370/412 |
| 2007/0060142 A1* | 3/2007 | Reznik et al. | 455/445 |
| 2007/0162610 A1* | 7/2007 | Un et al. | 709/230 |
| 2007/0177627 A1* | 8/2007 | Raju et al. | 370/469 |
| 2008/0165795 A1* | 7/2008 | Baruch | 370/421 |
| 2008/0225790 A1* | 9/2008 | Kupershmidt | 370/330 |

* cited by examiner

*Primary Examiner* — Jayanti K Patel
*Assistant Examiner* — Anthony Sol
(74) *Attorney, Agent, or Firm* — Reches Patents

(57) ABSTRACT

In a scheme for processing data chunks, MAC-PHY circuits are adapted to store data chunks of large data packets and to provide same to a shared memory unit across an interface controlled by a controller. A data transfer monitor is adapted to monitor the progress of such data provision and shared layer-two processors perform data chunk processing operations and data packet processing operations based upon such progress. A double data rate (DDR) controller, coupled between the shared memory unit and a DDR memory unit, provides data chunks from the first shared memory unit to the DDR memory unit.

22 Claims, 3 Drawing Sheets

DEVICE AND METHOD FOR PROCESSING DATA CHUNKS

FIELD OF THE INVENTION

The invention relates to methods and devices for managing data chunks, especially in a multi-port device.

BACKGROUND

Communication devices such as but not limited to routers and switches manage multiple flows of data. These data flows include multiple data packets that include data payloads as well as control information (also referred to as routing information) fields.

A typical communication device, including a layer-two switch or above communication device, receives a data packet over a physical (PHY) layer, then perform media access control (MAC) processing and then performs forwarding processing including classification, switching, queuing and editing.

Typical full-duplex multiple-port switches usually include a PHY layer circuit, a PHY-MAC circuit and a MAC layer circuit per port. This architecture is costly and size consuming, which ends up with high power consumption, especially in switches that have many ports and are expected to manage large packets.

There is a need to provide an efficient multi-port switch that can manage large packets and can include many ports and consume low ASIC die area.

SUMMARY OF THE INVENTION

A device for processing data chunks is provided. The device includes: (i) multiple MAC-PHY circuits connected to a first interface that is controlled by a first controller; (ii) a first shared memory unit that is connected to the first interface; (iii) multiple shared layer-two processors; (iv) a data transfer monitor adapted to monitor a progress of provision of data to the first shared memory unit; and (v) a first double data rate (DDR) controller, coupled between the first shared memory unit and a DDR memory unit. One or more MAC-PHY circuit is adapted to store a data chunk of a large data packet. The first controller is adapted to control a provision of data chunks from the multiple MAC-PHY circuits via the first interface to the first shared memory unit. The shared layer-two processors are adapted to perform data chunk processing operations and data packet processing operations, based upon the progress of provision of data to the first shared data unit. The DDR controller is adapted to provide data chunks from the first shared memory unit to the DDR memory unit.

Conveniently, the MAC-PHY circuits are adapted to perform protocol conversion to an internal protocol of the device.

Conveniently, the first shared memory unit and the shared layer-two processors are connected to the first interface via a very large bus for receiving multiple bits of a provided data chunk in parallel.

Conveniently, the device is adapted to determine a source associated with a received data chunk and to perform layer-two processing in response to the source.

Conveniently, at least one MAC-PHY circuit is adapted to receive data chunks associated with multiple sources.

Conveniently, the first controller is adapted to provide a data chunk to the first shared memory unit until an occurrence of an earliest event out of: (i) an end of a predefined transfer window, and (ii) a completion of a provision of a data packet that includes the data chunk.

Conveniently, the layer-two processors include a configurable Cyclic Redundancy Check processor.

Conveniently, the device further includes: (i) a second interface, (ii) a second shared memory unit, and (iii) a second controller. The second interface is connected between multiple MAC-PHY circuits and between the second shared memory unit. The second controller is adapted to control a provision of data chunks from the second shared memory unit to the multiple MAC-PHY circuits via the second interface. The DDR controller is adapted to provide data chunks from the DDR memory unit to the second shared memory unit.

According to another embodiment of the invention the first controller is further adapted to control a provision of data chunks from the first shared memory unit via the first interface to the multiple MAC-PHY circuits. The DDR controller is adapted to provide data chunks from the DDR memory unit to the first shared memory unit.

Conveniently, the device is adapted to arrange data packets at buffers that are associated with buffer descriptors and the device is adapted to invalidate a buffer descriptor associated with a data packet that failed a Cyclic Redundancy Check test performed by a layer-two processor.

A method for processing data chunks is provided. The method includes: (i) receiving multiple data chunks at multiple MAC-PHY circuits connected to a first interface; wherein at least one MAC-PHY circuit is adapted to store a single data chunk; (ii) repetitively selecting a MAC-PHY circuit, and providing a data chunk from the selected MAC-PHY circuit to a first shared memory unit while monitoring a progress of a provision of data chunks to the first shared memory unit; (iii) performing, by shared layer-two processors, data chunk processing operations and data packet processing operations, on data chunks stored at the first shared data unit, based upon the progress of provision of data to the first shared data unit; and (iv) providing data chunks stored at the first shared data unit to a double data rate (DDR) memory unit; wherein the stage of providing is controlled by a DDR controller connected between the first shared memory unit and the DDR memory unit.

Conveniently, the stage of receiving is followed by performing protocol conversion to an internal protocol.

Conveniently, the stage of providing of the data chunk includes providing the data chunk over a very large bus.

Conveniently, the method includes determining a source associated with a received data chunk and to performing the data chunk processing operations in response to the source.

Conveniently, the stage of receiving includes receiving by a MAC-PHY circuit data chunks associated with multiple sources.

Conveniently, the stage of providing the data chunk includes providing a data chunk until an occurrence of an earliest event out of an end of a predefined transfer window and a completion of a provision of a data packet that includes the data chunk.

Conveniently, the stage of data chunk processing and the data packet processing includes applying a configurable Cyclic Redundancy Check process.

Conveniently, the method includes: providing data chunks from the DDR memory unit to a second shared memory unit; performing, by shared layer-two processors, data chunk processing operations and data packet processing operations, on data chunks stored at the second shared data unit, based upon the progress of provision of data to the second shared data unit; and providing data chunks from the second shared memory unit to multiple PHY-MAC interfaces.

Conveniently, the method includes: providing data chunks from the DDR memory unit to the first shared memory unit;

performing, by shared layer-two processors, data chunk processing operations and data packet processing operations, on data chunks stored at the second shared data unit, based upon the progress of provision of data from the DDR memory unit to the first shared data unit; and providing data chunks from the first shared memory unit to multiple PHY-MAC interfaces.

Conveniently, the method includes arranging data packets at buffers that are associated with buffer descriptors and invalidating a buffer descriptor associated with a data packet that failed a Cyclic Redundancy Check test.

BRIEF DESCRIPTION OF THE DRAWINGS

The invention is herein described, by way of example only, with reference to the accompanying drawings, wherein.

DETAILED DESCRIPTION

A method and device for processing data packets are provided.

The method and device utilize at least one shared memory unit and shared layer-two processors to receive data chunks, process data chunks and send data chunks to a DDR memory unit.

Data packets (also referred to as data frames) can include multiple data chunks, especially when the size of data packets is very large. Performing data chunks transfer and data chunk processing (instead of only performing data packet transfer and processing) reduces the size of MAC-PHY circuits and prevents traffic problems (such as starvation, overflow) resulting from the transfer and processing of whole data packets.

Figure 1:
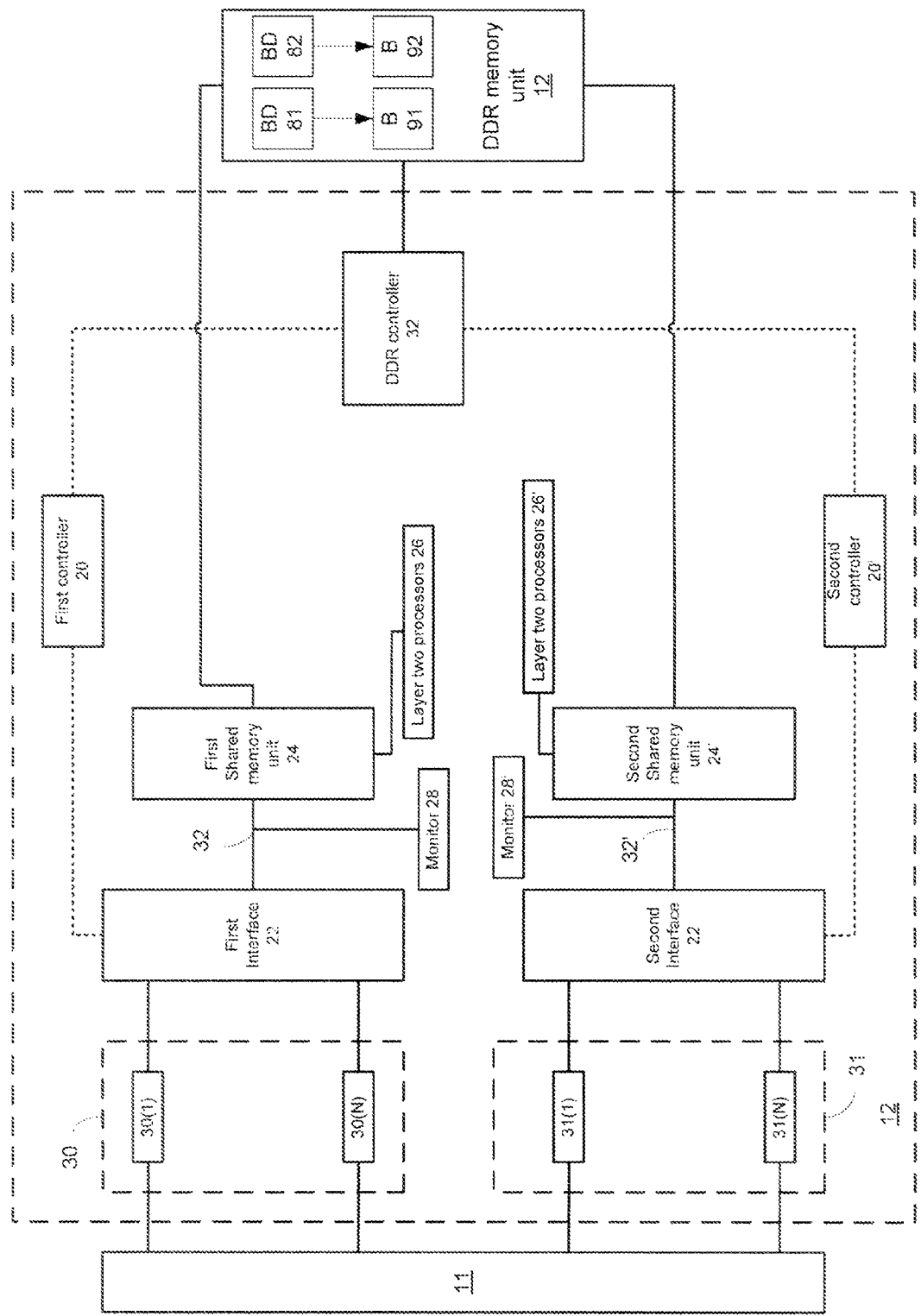
FIG. 1 illustrates a device according to an embodiment of the invention.

FIG. 1 illustrates device 10 according to an embodiment of the invention.

Device 10 can be a multi-port switch, can be a part of a multi-port switch, can include multiple multi-port switches and the like. Device 10 can include one or more multiple integrated circuits. Device 10 can include physical layer circuits as well as one or more memory units such as double data rate (DDR) memory units. For simplicity of explanation device 10 is illustrated as including first integrated circuit 11 that includes PHY layer circuits, second integrated circuit 12 that includes a DDR memory unit and a third integrated circuit 13.

Third integrated circuit 13 includes: first controller 20, second controller 20', first interface 22, second interface 22', first shared memory unit 24, second shared memory unit 24', layer-two ingress processors collectively denoted 26, layer-two egress processors collectively denoted 26', first data transfer monitor 28, second data transfer monitor 28', multiple MAC-PHY circuits collectively denoted 30 and DDR controller 32.

Conveniently, there are N ingress MAC-PHY circuits 30(1)-30(N) and N egress MAC-PHY circuits 31(1)-31(N). An ingress PHY-MAC interface 30(n) can store a single data chunk and can also convert the protocol of received data chunks to an internal protocol used by first interface 22.

An egress PHY-MAC interface 31(n) can store a single data chunk and can also convert the protocol of received data chunks from the internal protocol used by second interface 22' to a MAC-PHY protocol used between the egress MAC-PHY circuit and the corresponding PHY circuit of first integrated circuit.

The protocol conversion allows third integrated circuit 13 to exchange data chunks using different MAC-PHY protocols. Exemplary MAC-PHY protocols include MII, RMII, SMII, SMII, GMII and SGMII, but MAC-PHY circuits can manage other protocols.

It is noted that although FIG. 1 illustrated unidirectional MAC-PHY circuits that a MAC-PHY circuit can be bi-directional. Half-duplex protocols utilize bi-directional MAC-PHY circuits while full duplex protocols use unidirectional PHY-MAC circuits.

It is noted that third integrated circuit 13 conveniently includes multiple additional circuits such data processor (not shown), switching controller (not shown), and the like.

The ingress path of device 10 includes first integrated circuit 11, ingress MAC-PHY circuits 30(1)-30(N), first controller 20, first interface 22, first shared memory unit 24, layer-two ingress processors 26, first data transfer monitor 28, DDR controller 32 and DDR memory unit 12. First controller 20 is connected to first interface 22. First interface 22 has N inputs, each connected to an ingress MAC-PHY circuit 30(n) and a single output connected via a large bus 23, to first shared memory unit 24. First shared memory unit 24 is connected to DDR memory unit 12 and the provision of data chunks to DDR memory unit 12 is controlled by DDR controller 32.

First controller 20 can receive indications from MAC-PHY circuits 30(1)-30(N) indicating of a reception of data chunks and determine which MAC-PHY will gain access to first shared memory unit 24. The determination can involve applying any prior art arbitration method.

Once a MAC-PHY circuit (30(n)) is selected it is allowed to transfer a complete data chunk to first shared memory unit 24. Conveniently, first controller 20 allocates predefined transfer windows for the transfer of data chunks to first shared memory unit 24. A MAC-PHY circuit can be regarded as a reconciliation sub-layer circuit.

The length of the predefined transfer window is responsive to the length of the data chunks, as can be evaluated from the communication protocol of the data packets that includes the data chunks. For example, the inventors used transfer windows during which forty-eight bytes, one hundred and ninety two bytes or two hundred and fifty six bytes could be transferred.

It is noted that if the transfer of the last data chunk of a data packet ends before the predefined transfer window ends, then first controller 20 can control the transfer of another data chunk, without waiting to the completion of predefined data window.

The transfer of data chunks is monitored by first data transfer monitor 28. One or more counters can count the amount of data transferred from a certain source (or a certain MAC-PHY circuit) to determine the amount of data transfer and to indicate whether data chunk processing or data packet processing (or both) is required. Data transfer monitor 28 can also check metadata associated with data chunks in order to determine when a data packet starts and when a data packet ends. For example, the metadata can include a "first data chunk of packet" or a "last data chunk of packet" flag or indication as well as source or port identification information. This metadata can assist in monitoring the progress of data reception as well as determining which layer-two process operation to perform.

The progress of data reception can define which processing operation to perform by one or more shared layer-two processors 26. In some cases data chunk processing operations can be executed while in other cases data packet processing operations should be executed.

For example, a data chunk processing operation such as a cyclic redundancy check (CRC) can be performed per data chunk in order to provide a data chunk CRC result. Once a whole data packet is processed multiple CRC chunk results can be added to each other to provide a single CRC packet result that is compared to an expected CRC packet result. If the calculated result differs from the expected CRC packet result device 10 can ignore data chunks that belong to that data packet are currently stored within DDR memory unit 12. This can involve deleting or otherwise ignoring a buffer descriptor that is associated with the currently stored data chunks. Accordingly, multiple data chunk processing operations are followed by a data packet processing operation. Referring to FIG. 1, buffer descriptors ("BD") 81 and 82 point to buffers 91 and 92. Usually, the buffer descriptors are arranged in rings, where one buffer descriptors points to the next buffer descriptor.

The layer-two processors (collectively denoted 26) can include error correction and/or error detection processors such as a CRC processor, half duplex processor and the like. It is noted that different communication protocols can require different CRC calculations and that the CRC processor can be configured to apply the appropriate CRC calculation per data packet type (AAL5 Over ATM, Ethernet, MPLS and the like).

Conveniently, first shared memory unit 24 and shared layer-two processors 26 are connected to first interface 22 via large bus 64 for receiving multiple bits of a provided data chunk in parallel. The inventors used a sixty four bit wide bus, although wider (or narrower) buses can be used. In order to speed up the layer-two processing the layer-two processors are adapted to operate in a parallel manner.

The inventors used a double buffer FIFO as a first shared memory unit 24, thus allowing a reception of a data chunk from first interface 22 while sending another data chunk to DDR memory unit 12. It is noted that other shared memory units can be used.

The egress path of device 10 includes first integrated circuit 11, egress MAC-PHY circuits 31(1)-31(N), second controller 20', second interface 22', second shared memory unit 24', layer-two egress processors 26', second data transfer monitor 28', DDR controller 32 and DDR memory unit 12. Second controller 20' is connected to second interface 22'. Second interface 22' has a single input and N outputs, each connected to an egress MAC-PHY circuit 31(n). The input of second interface 22' is connected to second shared memory unit 24' via large bus 32'. Second shared memory unit 24 is connected to DDR memory unit 12 and the provision of data chunks from DDR memory unit 12 is controlled by DDR controller 32.

Second controller 20' can be an egress controller that control that transmission of data chunks from device 10 or can receive instructions or other control signals from an egress controller and in response request from DDR controller 32 to fetch data chunks from DDR memory unit 12 and send them to second shared data unit 24'.

Second controller 20' also sends control signals to second interface 22' in order to determine which egress MAC-PHY circuit (31(n)) will receive the data chunk from second shared memory unit 24'.

Conveniently, second controller 20' allocates predefined transfer windows for the transfer of data chunks to second shared memory unit 24'. The length of the predefined transfer window is responsive to the length of the data chunks, as can be evaluated from the communication protocol of the data packets that includes the data chunks. It is noted that if the transfer of the last data chunk of a data packet ends before the predefined transfer window ends, then second controller 20' can control the transfer of another data chunk, without waiting to the completion of predefined data window.

The transfer of data chunks is monitored by second data transfer monitor 28'. One or more counters can count the amount of data transferred to a certain destination (or a certain MAC-PHY circuit) to determine the amount of data transfer and to indicate whether data chunk processing or data packet processing (or both) is required. Data transfer monitor 28 can also check metadata associated with data chunks in order to determine when a data packet starts and when a data packet ends.

The progress of data reception can define which processing operation to perform by one or more shared layer-two processors 26. In some cases data chunk processing operations can be executed while in other cases data packet processing operations should be executed.

The layer-two processors (collectively denoted 26') can include error correction and/or error detection processors such as a CRC processor, half duplex processor and the like. It is noted that different communication protocols can require different CRC calculations and that the CRC processor can be configured to apply the appropriate CRC calculation per data packet type (ATM, Ethernet, and the like).

Conveniently, second shared memory unit 24' and shared layer-two processors 26' are connected to second interface 22' via large bus 32' for transmitting multiple bits of a provided data chunk in parallel.

The inventors used a double buffer FIFO as a second shared memory unit 24', thus allowing a provision of a data chunk to second interface 22' while receiving another data chunk from DDR memory unit 12. It is noted that other shared memory units can be used.

Figure 2:
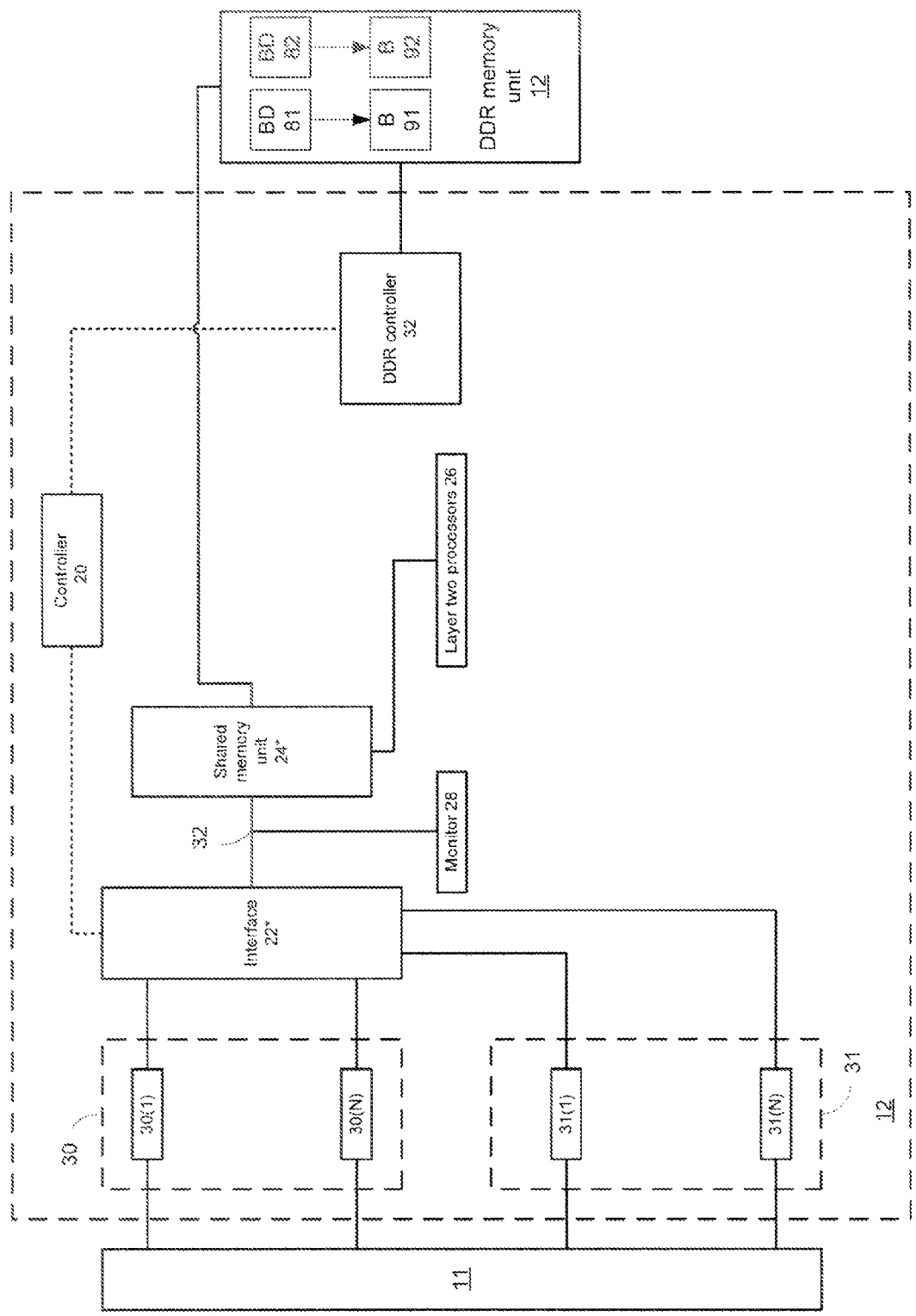
FIG. 2 illustrates a device according to another embodiment of the invention.

FIG. 2 illustrates device 10' according to another embodiment of the invention.

Device 10' differs from device 10 of FIG. 10 by sharing more components (such as processor 20*, shared memory unit 24*, interface 22*) between egress and ingress paths.

Processor 20* controls transfer of data from MAC-PHY circuits 30 towards DDR memory unit 12 and transfer of data from DDR memory unit 12 towards MAC-PHY circuits 31.

Interface 22* is connected between shared memory unit 24* and between MAC-PHY circuits 30 and 31.

Figure 3:
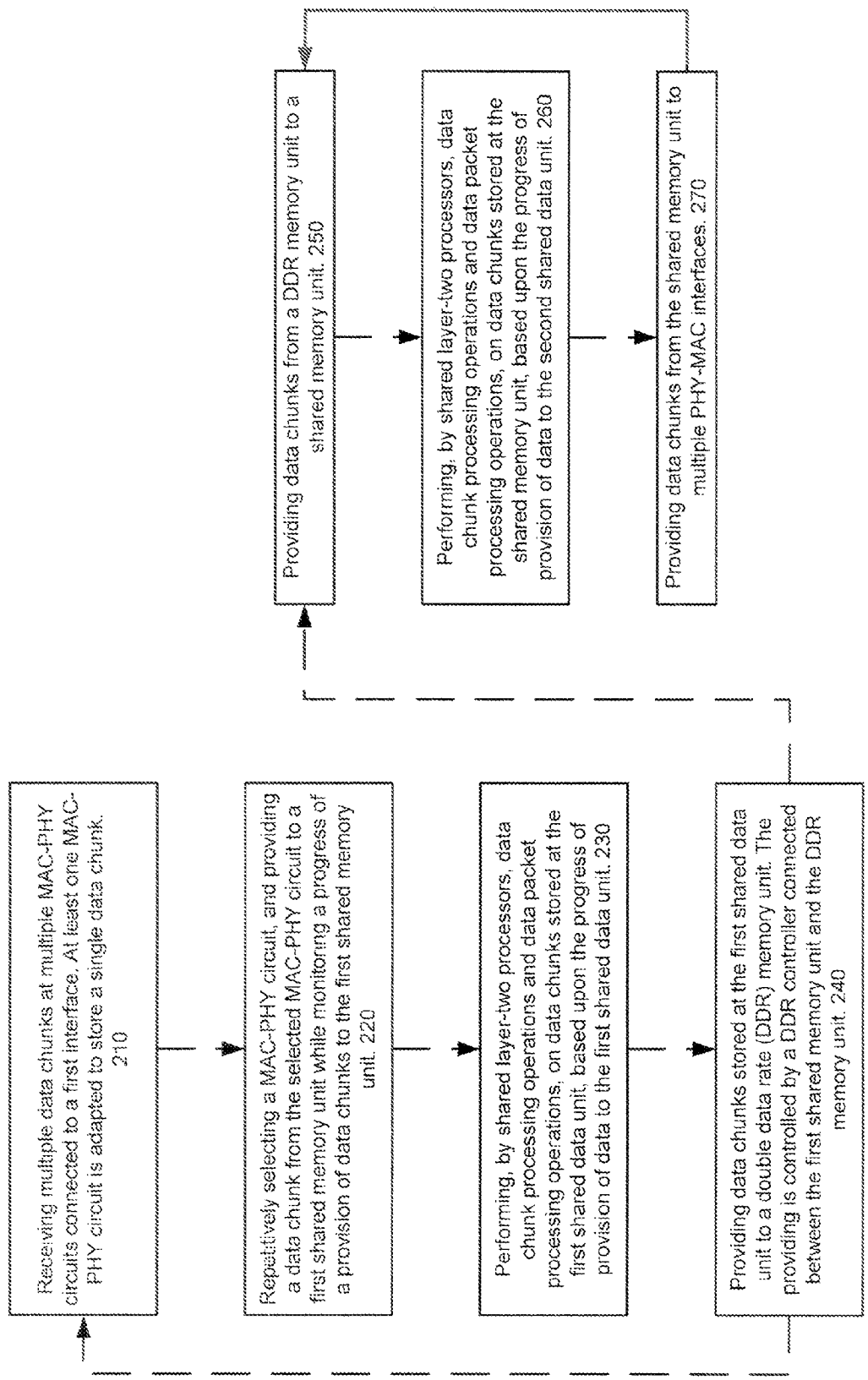
FIG. 3 is a flow chart of a method for processing data chunks according to another embodiment of the invention.

FIG. 3 illustrates method 200 for processing data chunks according to an embodiment of the invention.

Method 200 includes stages 210-240. These stages can be executed in a sequential manner or in parallel to each other. While a certain data chunk is first received at a MAC-PHY circuit, then sent to a shared memory unit be processed and finally sent to a DDR memory unit, those of skill in the art will appreciate that while one data chunk is received by a MAC-PHY circuit another data chunk can be transferred to a shared memory unit, yet a further data chunk can be concurrently layer-two processed and yet a further data chunk is transferred to a DDR memory unit. Accordingly, stages 210-240 are illustrated as following each other for simplicity of explanation only.

Method 200 starts by stage 210 of receiving multiple data chunks at multiple MAC-PHY circuits connected to a first interface. At least one MAC-PHY circuit is adapted to store a single data chunk. Stage 210 can be repeated during the execution of other stages of method 200.

Stage 210 can include storing the receive data chunks at the MAC-PHY circuits and performing protocol conversion to an internal protocol.

Stage 210 can include receiving by a MAC-PHY circuit data chunks associated with multiple sources.

Stage 210 is followed by stage 220 of repetitively selecting a MAC-PHY circuit, and providing a data chunk from the selected MAC-PHY circuit to a first shared memory unit while monitoring a progress of a provision of data chunks to the first shared memory unit.

Conveniently, stage 220 includes providing the data chunk over a very large bus. Conveniently, stage 220 includes providing a data chunk until an occurrence of an earliest event out of an end of a predefined transfer window and a completion of a provision of a data packet that comprises the data chunk.

Stage 220 is followed by stage 230 of performing, by shared layer-two processors, data chunk processing operations and data packet processing operations, on data chunks stored at the first shared data unit, based upon the progress of provision of data to the first shared data unit.

Conveniently, stage 230 includes applying a configurable Cyclic Redundancy Check process.

Conveniently, stage 230 includes determining a source associated with a received data chunk and performing the data chunk processing operations in response to the source.

Stage 230 is followed by stage 240 of providing data chunks stored at the first shared data unit to a double data rate (DDR) memory unit. This stage of providing is controlled by a DDR controller connected between the first shared memory unit and the DDR memory unit. It is noted that the providing can include storing data chunks at buffers associated with buffer descriptors. It is further noted that stage 240 can include invalidating a buffer descriptor associated with a data packet that failed a Cyclic Redundancy Check test.

Stages 210-240 illustrate an operation of an ingress path. Method 200 can include additional stages (such as stages 250-270) that illustrate the operation of an egress path. Stages 210 can be executed in parallel to stages 250-270.

Stage 250 includes providing data chunks from a DDR memory unit to a shared memory unit. The same DDR memory unit and the same shared memory unit can be used during stages 240 and 250 but this is not necessarily so. For example, stage 250 can include sending data chunks to a second shared memory unit that differs from the first shared memory unit used during stage 220.

Stage 250 is followed by stage 260 of performing, by shared layer-two processors, data chunk processing operations and data packet processing operations, on data chunks stored at the shared memory unit, based upon the progress of provision of data to the second shared data unit. The layer-two processors can be used during stages 230 and 260 but this is not necessarily so.

Stage 260 is followed by stage 270 of providing data chunks from the shared memory unit to multiple PHY-MAC interfaces. Stage 270 can include selecting a data chunk destination and in response selecting the MAC-PHY circuit that will receive the data chunk over a second interface connected between the MAC-PHY circuits and the shared layer-two memory unit. Bi-directional MAC-PHY circuits can be used during stages 260 and 210. Typically, different unidirectional MAC-PHY circuits are used in stages 210 and 260.

While the invention has been described with respect to a limited number of embodiments, it will be appreciated that many variations, modifications and other applications of the invention may be made.

What is claimed is:

1. A device, comprising:
    multiple MAC-PHY circuits coupled to a first interface that is controlled by a first controller;
    a first shared memory unit coupled to the first interface;
    multiple shared layer-two processors;
    a data transfer monitor adapted to monitor a progress of provision of data to the first shared memory unit;
    a first double data rate (DDR) controller, coupled between the first shared memory unit and a DDR memory unit;
    wherein at least one MAC-PHY circuit is adapted to store a data chunk of a large data packet;
    wherein the first controller is adapted to control a provision of data chunks from the multiple MAC-PHY circuits via the first interface to the first shared memory unit;
    wherein the shared layer-two processors are adapted to perform data chunk processing operations and data packet processing operations, based upon the progress of provision of data to the first shared memory unit; and
    wherein the DDR controller is adapted to provide data chunks from the first shared memory unit to the DDR memory unit.

2. The device according to claim 1 wherein the MAC-PHY circuits are adapted to perform protocol conversion to an internal protocol of the device.

3. The device according to claim 1 wherein the first shared memory unit and the shared layer-two processors are coupled to the first interface via a very large bus that is at least sixty four bits wide for receiving multiple bits of a provided data chunk in parallel.

4. The device according to claim 1 wherein the device is adapted to determine a source associated with a received data chunk and to perform layer-two processing in response to the source.

5. The device according to claim 4 wherein at least one MAC-PHY circuit is adapted to receive data chunks associated with multiple sources.

6. The device according to claim 1 wherein the first controller is adapted to provide a data chunk to the first shared memory unit until an occurrence of an earliest event out of an end of a predefined transfer window and a completion of a provision of a data packet that comprises the data chunk.

7. The device according to claim 1 wherein the layer-two processors comprise a configurable Cyclic Redundancy Check processor.

8. The device according to claim 1 further comprising a second interface coupled between multiple MAC-PHY circuits and a second shared memory unit, the second interface controlled by a second controller adapted to control provision of data chunks from the second shared memory unit to the multiple MAC-PHY circuits via the second interface; and wherein the DDR controller is adapted to provide data chunks from the DDR memory unit to the second shared memory unit.

9. The device according to claim 1 wherein the first controller is further adapted to control a provision of data chunks from the first shared memory unit via the first interface to the multiple MAC-PHY circuits; and wherein the DDR controller is adapted to provide data chunks to the first shared memory unit from the DDR memory unit.

10. The device according to claim 1 wherein the device is adapted to arrange data packets at buffers that are associated with buffer descriptors and wherein the device is adapted to invalidate a buffer descriptor associated with a data packet that failed a Cyclic Redundancy Check test performed by a layer-two processor.

11. A method for processing data chunks, the method comprising:

receiving multiple data chunks at multiple MAC-PHY circuits coupled to a first interface; wherein at least one MAC-PHY circuit is adapted to store a single data chunk;

repetitively selecting a MAC-PHY circuit, and providing a data chunk from the selected MAC-PHY circuit to a first shared memory unit; while monitoring a progress of a provision of data chunks to the first shared memory unit;

performing, by shared layer-two processors, data chunk processing operations and data packet processing operations, on data chunks stored at the first shared memory unit, based upon the progress of provision of data to the first shared memory unit; and providing data chunks stored at the first shared memory unit to a double data rate (DDR) memory unit; wherein the providing is controlled by a DDR controller coupled between the first shared memory unit and the DDR memory unit.

12. The method according to claim 11 wherein the receiving is followed by performing protocol conversion to an internal protocol.

13. The method according to claim 11 wherein the providing of the data chunk comprises providing the data chunk over a very large bus that is at least sixty four bits wide.

14. The method according to claim 11 further comprising determining a source associated with a received data chunk and to performing the data chunk processing operations in response to the source.

15. The method according to claim 14 wherein the receiving comprises receiving by a MAC-PHY circuit data chunks associated with multiple sources.

16. The method according to claim 11 wherein providing the data chunk comprises providing a data chunk until an occurrence of an earliest event out of an end of a predefined transfer window and a completion of a provision of a data packet that comprises the data chunk.

17. The method according to claim 11 wherein the data chunk processing and the data packet processing comprising applying a configurable Cyclic Redundancy Check process.

18. The method according to claim 11 further comprising: providing data chunks from the DDR memory unit to a second shared memory unit; performing, by shared layer-two processors, data chunk processing operations and data packet processing operations, on data chunks stored at the second shared data unit, based upon the progress of provision of data to the second shared data unit; and providing data chunks from the second shared memory unit to multiple PHY-MAC interfaces.

19. The method according to claim 11 further comprising: providing data chunks from the DDR memory unit to the first shared memory unit; performing, by shared layer-two processors, data chunk processing operations and data packet processing operations, on data chunks stored at the second shared data unit, based upon the progress of provision of data from the DDR memory unit to the first shared data unit; and providing data chunks from the first shared memory unit to multiple PHY-MAC interfaces.

20. The method according to claim 11 further comprising arranging data packets at buffers that are associated with buffer descriptors and invalidating a buffer descriptor associated with a data packet that failed a Cyclic Redundancy Check test.

21. A device, comprising:

a first integrated circuit that comprises PHY layer circuits;

multiple ingress MAC-PHY circuits, wherein each of the ingress MAC-PHY circuits is adapted to receive data chunks from circuits of the first integrated circuit; to store just a single data chunk at a time, wherein the single data chunk is a data chunk of a large data packet that comprises multiple data chunks; and to convert a protocol of received data chunks to an internal protocol used by a first interface that is coupled to each of the multiple ingress MAC-PHY circuits and is configured to receive data chunks from the ingress MAC-PHY circuits; wherein the first interface that comprises a single output that is coupled to a first shared memory unit of the device;

a data transfer monitor adapted to monitor a progress of provision of data to the first shared memory unit;

multiple shared layer-two ingress processors that are adapted to perform: (a) data chunk processing operations on individual data chunks; and (b) data packet processing operations on data packets, each of which comprises multiple data chunks; wherein the shared layer-two ingress processors are configured to perform the processing operations of the data chunks and the data packets, based upon the progress of provision of data to the first shared memory unit; wherein at least some of the processing operations are error detection operations carried out by at least one error detection processor of the multiple shared layer-two ingress processors;

a first controller that is coupled to the first interface, and adapted to control a provision of data chunks from the multiple MAC-PHY circuits via the single output of the first interface to the first shared memory unit, in response to indication received from ingress MAC-PHY circuits indicating of a reception of data chunks;

a double data rate (DDR) memory unit that receives data chunks from the first shared memory unit; and a DDR controller, coupled between the first shared memory unit and the DDR memory unit; wherein the DDR controller controls a provision of data chunks from the first shared memory unit to the DDR memory unit.

22. The device according to claim 21, further comprising:

multiple egress PHY-MAC circuits, wherein each of the egress MAC-PHY circuits is adapted to store just a single data chunk of a large data packet that comprises multiple data chunks; and to convert a protocol of received data chunks from the internal protocol used by a second interface to a MAC-PHY protocol used between the egress MAC-PHY circuit and a corresponding PHY circuit of an integrated circuit of the device that comprises PHY layer circuits;

a second shared memory unit, that is distinct from the first shared memory unit and that is coupled to the DDR memory unit;

a second interface that is distinct from the first interface, and which is coupled between the second shared memory unit and the multiple egress PHY-MAC circuits;

a second controller, that is distinct from the first controller, configured to send control signal to the second interface in order to determine which egress MAC-PHY circuit out of the multiple egress MAC-PHY circuit will receive a data chunk from the second shared memory unit;

a second data transfer monitor that is configured to monitor transfer of data chunks from the second shared memory unit to the egress MAC-PHY components via the second interface; and multiple layer-two egress processors that are distinct from the multiple shared layer-two ingress processors and that are coupled to the second memory unit, wherein the multiple layer-two egress processors are configured to perform: (a) data chunk processing operations on individual data chunks; and (b) data packet processing operations on data packets, each of which comprises multiple data chunks; based upon progress of transfer of data monitored by the second data transfer monitor, wherein at least some of the processing operations are carried out by an error correction processor.

* * * * *